May 21, 1957  G. K. C. HARDESTY  2,792,803
ILLUMINATING ASSEMBLY FOR INDICATING INSTRUMENTS
Original Filed Aug. 22, 1952
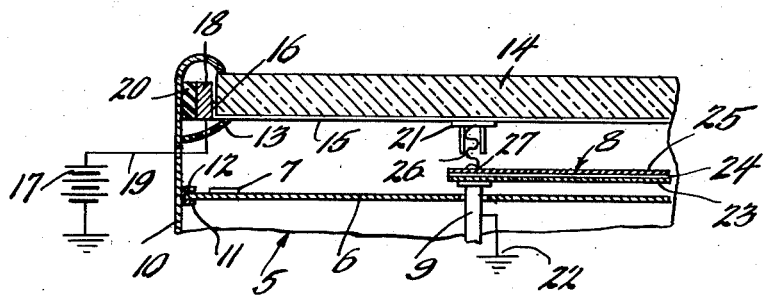
INVENTOR
George K. C. Hardesty,
BY George Sipkin
B. L. Zangwill
ATTORNEYS

United States Patent Office 2,792,803
Patented May 21, 1957

2,792,803

ILLUMINATING ASSEMBLY FOR INDICATING INSTRUMENTS

George K. C. Hardesty, Mayo, Md.

Original application August 22, 1952, Serial No. 305,930, now Patent No. 2,738,759, dated March 20, 1956. Divided and this application December 22, 1955, Serial No. 554,900

3 Claims. (Cl. 116—129)

(Granted under Title 35, U. S. Code (1952), sec. 266)

The invention described herein may be manufactured and used by or for the Government of the United States of America for governmental purposes without the payment of any royalties thereon or therefor.

This application is a division of application, Serial No. 305,930, filed August 22, 1952, now United States Patent No. 2,738,759, granted March 20, 1956, and relates to illumination of dial type instruments and, more particularly, to means providing for selective illumination of the full 360 degrees of a dial, without shadow effects from electrical conductors to the illuminating source, and more specifically to an electroluminescent indicator therefor.

Various arrangements have previously been used for illuminating the face of a clock, meter or other instrument to provide night visibility thereof. Among these are edge illumination devices, which are generally complex and expensive with insufficient illumination resulting from the inefficient light transmission to the instrument face. Another form of illumination involves a central light source within the face and in front of the dial, to which energy is supplied by conductors crossing the dial face and thereby causing shadows and obscuring a portion of the dial and the indicia thereon, or interfering with the movement of any pointers associated therewith. Other dial illumination devices utilize an electric lamp in cooperation with a translucent pointer to selectively illuminate the indicia on the dial face. In all, the electric lamp is subject to breakage and burnout.

The present invention is an improvement in selective face illumination and is achieved by the employment of indicators or pointers having electro-luminescent light sources therein, said indicators cooperating with the dial face of the instrument which carries invisible conductors which supply energy to said light sources. The invisible conductors do not leave shadows or obscure indicia or indicators and do not interfere with movement of the indicators.

It is, therefore, an object of the invention to provide an illuminated dial and indicating means for an instrument which is lighted without obscurance of, or interference with, indications thereon and wherein the indicator provides the illumination therefor.

A further object of the invention is to provide simple and rugged means of rendering a dial indication visible which requires little or no servicing.

A still further object of the invention is to provide an indicating instrument having invisible means for energizing the indicating element of the instrument.

Another object of the invention is to provide a dial indicating instrument having an electro-luminescent indicator.

Other objects and many of the attendant advantages of this invention will be readily appreciated as the same becomes better understood by reference to the following detailed description when considered in connection with the accompanying drawings wherein:

The figure illustrates in partial vertical section the invention employing a single thickness of glass cover with a transparent conducting layer secured thereto and an electroluminescent indicating means.

Referring now to the drawing, there is illustrated the upper portion of an instrument 5 having a dial plate 6 with indicia 7 thereon, over which a pointer indicator generally designated as 8, operates to provide the information desired. Shaft 9 shown broken away, extends to the mechanism of the instrument to provide rotation of the indicator 8.

The dial plate 6 is supported in any conventional manner in a casing 10, for instance, by rings 11 and 12 which may engage grooves or threads in the casing 10 or may be secured thereto by soldering, screws, or the like. The casing 10 is preferably provided with a rubber or plastic ring 13 adapted to support a transparent instrument face consisting, for example, of a laminated transparent structure including transparent plate 14 of glass or plastic, as may be desired, and having deposited thereon transparent conducting layer 15 employed for bringing electrical current to the center of the instrument face for operating the indicator or light source 8.

The conducting layer 15 is preferably provided at the edge of plate 14 with a turned over portion 16, illustrated in the figure as turned over the plate 14 to form a conductor around the periphery. While the layer 15 is shown as having appreciable thickness it may consist of very thin deposited layers of material, such as might be applied by sputtering techniques and may be of molecular dimensions. Where a thin deposited layer of the conducting material is applied, it is preferable to employ at least a large portion of the face area in order that the thin conductive layer may be able to carry sufficient electrical current without undue heating or voltage drop.

A power source 17 may be connected to the conducting layer 15 in any convenient manner as by pads, pressure plates, or other suitable contact making means. In the figure connection is made by means of a ring 18 within the casing and extending circumferentially around plate 14. Ring 18 is adapted to fit snugly against the turned up portion 16 and is illustrated as forming electrical contact between the portion 16 and a lead 19 passing through the casing 10. Ring 18 is insulated from the casing 10 by a rubber or plastic ring 20. The illuminable indicator member 8 is illustrated as attached to shaft 9, the member 8 being of special design to render the same visible apart from general illumination of the face. The plate 14 and conducting layer 15 thereon cooperate with a pad or contacting member 21 centrally located for supplying energy to the illuminable member 8 and the other terminal shown as a ground connection 22 connected to shaft. This embodiment permits the use of the position indicating member 8 without general illumination. The indicating member comprises a metallic backing at 23 with a coating of material 24 thereon which is electro-luminescent. This material has the characteristic of visibly glowing when an electric potential is imposed thereacross. For this purpose, a layer of transparent conducting material 25 may be deposited on the layer 24 of luminescent material. A flexible lead, or pig tail, 26, soldered or otherwise attached at 27 extends from the layer 25 to make contact with the pad 21 and circuit of layer 15, which serves to distribute electrical potential over the front face of the indicator element. The layer 24 is non-conducting and supports the potential difference applied between layer 25 and member 23, the latter member being grounded through shaft 9. In this case only the illuminated indicating member or pointer 8 is seen as the instrument 5 is observed.

It may be noted that when the resistance of the thin sheet conductor or layer 15 is selected to provide particular voltage drops and consequent heating effects as desired the transparent face conductor becomes an efficient means for defrosting and for preventing formation of moisture on, or fogging of, the instrument face.

Obviously many modifications and variations of the present invention are possible in the light of the above teachings. It is therefore to be understood, that within the scope of the appended claims, the invention may be practiced otherwise than as specifically described.

What is claimed is:

1. An illuminated indicator comprising a casing having a dial plate secured therein, indicia means mounted upon said dial plate, shaft means mounted within said casing, a composite transparent conducting face plate comprising transparent conducting means, electric potential distributing means concentrically connected to said transparent conducting means, an indicating member secured to said shaft means, and comprising a metalic backing having an electro-luminescent means and a transparent conducting means mounted thereon, connecting means coupling said transparent conducting means and said electric potential distributing means to thereby energize said indicating member to a visible glow.

2. An illuminating instrument comprising a dial and indicating means associated therewith including a transparent cover plate having thereon a transparent electric conducting surface, a movable indicator providing an indication and having means illuminating said indicator when electrically energized, means supporting said indicator, and circuit means including said conducting surface and said supporting means for energizing said indicator illuminating means.

3. An illuminated instrument comprising a casing having a stationary dial plate secured therein, indicia means mounted on said dial plate, rotatable shaft means mounted within the casing centrally of the dial plate, a composite transparent conducting face plate mounted in front of the stationary dial and comprising transparent conducting means, electric potential distributing means concentrically connected to the transparent conducting means, a pointer secured to said shaft means, said pointer comprising a metalic backing member grounded to the shaft and having an electro-luminescent means and a transparent conducting means superimposed thereon, and connecting means coupling the electric potential distributing means to the transparent conducting means of the pointer to thereby energize the pointer to a visible glow.

References Cited in the file of this patent

UNITED STATES PATENTS 2,738,759     Hardesty _____ Mar. 20, 1956

OTHER REFERENCES

Electrical Construction and Maintenance, February 1952 issue.